(12) United States Patent
Bulan

(10) Patent No.: US 6,458,333 B1
(45) Date of Patent: Oct. 1, 2002

(54) PROCESS FOR RECYCLING ALKALI METAL FLUORIDES AND/OR DIFLUORIDES

(75) Inventor: Andreas Bulan, Langenfeld (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/546,274

(22) Filed: Apr. 10, 2000

(30) Foreign Application Priority Data

Apr. 19, 1999 (DE) .......................... 199 17 610

(51) Int. Cl.[7] .......................... C01F 5/28; C01D 15/00; B01D 11/00
(52) U.S. Cl. ..................... 423/179; 423/206.1; 423/490
(58) Field of Search ................................ 423/179, 202, 423/490, 206.1

(56) References Cited

U.S. PATENT DOCUMENTS

| | | | |
|---|---|---|---|
| 3,808,322 A | 4/1974 | Lam et al. | 423/185 |
| 4,056,604 A | * 11/1977 | Thompson et al. | 423/483 |
| 4,655,827 A | * 4/1987 | Sanjuro et al. | 75/84.4 |
| 4,793,936 A | 12/1988 | Lefrancois et al. | 210/729 |
| 5,881,359 A | * 3/1999 | Slagle et al. | 423/20 |
| 5,910,297 A | * 6/1999 | Cicha et al. | 423/490 |
| 6,153,164 A | * 11/2000 | Bulko et al. | 423/260 |

FOREIGN PATENT DOCUMENTS

GB  1422363  * 5/1973 ........... C01F/11/22

JP  5378999  * 7/1978 ........... B01D/53/34

OTHER PUBLICATIONS

Houben–Weyl, "Methoden der organischen Chemie" [Methods of Organic Chemistry], 4th Edition, vol. V, Part 3, (month unavailable) 1962, pp. 145–171) Einführung von Fluor in organische Verbindungen mittels Metallsalzen der Flusssäure.

Ullmann's Encyclopedia of Industrial Chemistry, 5th vol., (month unavailable) 1988, A11, pp. 379–380, Fluorine Compounds, Organic.

Gmelins Handbuch der Anorganischen Chemie, Bd. 21, Nr. Ergänzungsband Lieferung 1, 1964, Seiten 119–120, XP002143445, Verlag Chemie, Weinheim, R. J. Meyer, et al "Natriumhalogenide, Natriumfluorid NaF".

* cited by examiner

*Primary Examiner*—Wayne A. Langel
*Assistant Examiner*—Jonas N. Strickland
(74) *Attorney, Agent, or Firm*—Joseph C. Gil; Richard E. L. Henderson

(57) ABSTRACT

The invention relates to a process for recovering alkali metal fluorides and/or difluorides from waste mixtures containing alkali metal chlorides and/or alkali metal fluorides and/or difluorides and, optionally, organic compounds, by (a) subjecting a waste mixture comprising one or more alkali metal chlorides and/or one or more alkali metal fluorides and/or difluorides and, optionally, one or more organic compounds, to a thermal/oxidative pre-treatment and/or an extractive pre-treatment, and (b) bringing the pre-treated mixture into contact with hydrogen fluoride.

6 Claims, No Drawings

PROCESS FOR RECYCLING ALKALI METAL FLUORIDES AND/OR DIFLUORIDES

BACKGROUND OF THE INVENTION

The present invention relates to a process for recovering alkali metal fluorides and/or difluorides from waste mixtures.

Waste mixtures that are particularly suitable for the process according to the invention are, for example, those obtained in halogen exchange reactions where in organic compounds such as, for example, p-chloronitrobenzene, chlorine atoms are replaced by fluorine atoms. These reactions are referred to as halex-reactions (halex stands for halogen exchange). These reactions employ alkali metal fluoride and/or difluoride, which is converted into alkali metal chloride during the reaction. Cf. Houben-Weyl, "Methoden der organischen Chemie" [Methods of Organic Chemistry], 4th Edition, Volume V, Part 3, 1962, pages 145 ff.; Ullmann's Encyclopedia of Industrial Chemistry, 5th Vol., (1988), A11, page 379.

Schematically, the reaction can be represented as follows:

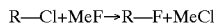

where

R represents an organic radical and

Me represents an alkali metal ion.

However, these exchange reactions are never quantitative. In general, in addition to the reaction product, a waste mixture comprising alkali metal chloride, fluoride, and residues of organic compounds is formed. For work-up, the reaction product is separated from the salt mixture, in most cases by distillation. What remains is a waste mixture comprising the alkali metal chlorides and/or difluorides and, if appropriate, unreacted starting material and organic by-products.

Up to now, the only option for this waste mixture of alkali metal chloride, alkali metal fluoride and/or difluoride, and residues of organic compounds was disposal. In addition to the very high disposal costs that are incurred, a considerable amount of unreacted alkali metal fluoride and/or difluoride is discarded.

It was, therefore, an object of the present invention to recover the unreacted alkali metal fluorides or difluorides from waste mixtures, particularly those obtained from halogen exchange reactions, and to convert the alkali metal chlorides formed back into the fluorides.

SUMMARY OF THE INVENTION

Thus, the present invention relates to a process for recovering alkali metal fluorides and/or difluorides from waste mixtures containing alkali metal chlorides and/or alkali metal fluorides and/or difluorides and, optionally, organic compounds, comprising (a) subjecting a waste mixture comprising one or more alkali metal chlorides and/or one or more alkali metal fluorides and/or difluorides and, optionally, one or more organic compounds, to a thermal/ oxidative pre-treatment and/or an extractive pre-treatment, and (b) bringing the pre-treated mixture into contact with hydrogen fluoride.

DETAILED DESCRIPTION OF THE INVENTION

The alkali metal fluorides recovered in this manner generally have an alkali metal fluoride content of more than 95% by weight (preferably of 99% by weight) and can, for example, be re-employed directly in the halogen exchange process.

Alkali metals are to be understood as meaning, in particular, sodium and potassium. Organic compounds are to be understood as meaning, for example, halogenated aromatic compounds such as p-chloronitrobenzene and tetrachlorobenzotrifluoride. The waste mixtures generally comprise 30 to 60% by weight of alkali metal chlorides, 10 to 50% by weight of alkali metal fluorides and/or difluorides, and from 0 to 20% by weight of organic compounds.

The thermal/oxidative treatment of the waste mixture is carried out by heating the waste mixture in the presence of air at temperatures of from 400 to 1110° C. for from 10 sec to 5 hours.

This thermal/oxidative treatment can also be carried out with increased addition of air or introduction of elemental oxygen, which reduces the treatment time and/or the temperature.

The extractive treatment is carried out as follows: The waste material is treated in commercial extractors with a solvent. Suitable solvents are those in which potassium fluoride and/or chloride is/are insoluble or only sparingly soluble. The extraction is usually carried out at the boiling point of the solvent but can also be carried out at lower temperatures or else under pressure. Suitable solvents are, for example, dimethyl ketone or dichloromethane.

If a combination of thermal/oxidative treatment and extractive treatment is carried out, it is recommended to initially carry out the thermal/oxidative treatment and then the extractive treatment.

After the thermal/oxidative or extractive treatment or their combination has been carried out, the waste mixture has a carbon content of from 0.01 to 5% (preferably less than 1%). The organic compounds (in most cases only carbon or high-molecular-weight organic compounds) contained in the waste mixture pre-treated in this manner are insoluble in liquid hydrogen fluoride and in water.

The waste mixture can be brought into contact with hydrogen fluoride at temperatures of from −10° C. to 500° C. (preferably from 0° C. to 500° C.). Both liquid and gaseous hydrogen fluoride are suitable. If the reaction is carried out optimally, only the stoichiometric amount of hydrogen fluoride is required. The lower the temperature, the more hydrogen fluoride is required. If the waste mixture which has been pretreated thermally/oxidatively or extractively still comprises residues of organic compounds (i.e., the carbon content is about 1%), it is possible to employ an excess of hydrogen fluoride of 2 to 10 mol per 1 mol of alkali metal and to remove any compounds still present that are insoluble in hydrogen fluoride by filtration of the solution formed. Likewise, it is possible to dissolve the waste mixture that has been brought into contact with hydrogen fluoride in water, and any organic impurities still present can be removed by filtration in the aqueous system. Any excess hydrogen fluoride can be neutralized with an appropriate base (such as alkali metal hydroxide or alkali metal carbonate or aqueous solutions thereof). The alkali metal fluoride and/or difluoride solution obtained in this manner can then be passed to further processing, such as drying.

The following example further illustrates details for the process of this invention. The invention, which is set forth in the foregoing disclosure, is not to be limited either in spirit or scope by these examples. Those skilled in the art will readily understand that known variations of the conditions of the following procedures can be used. Unless otherwise

EXAMPLE

The waste mixture resulting from the preparation of tetrafluoro-benzotrifluoride has the following composition: 21.3% organic components, 34.2% potassium fluoride, and 44.5% potassium chloride. This waste mixture was exposed to the atmosphere at a temperature of 1000° C. for 3 hours. 95.4 g of the waste mixture treated in this manner were, at 20° C., brought into contact with 388 g of anhydrous hydrogen fluoride, and some of the hydrogen fluoride was distilled off. The residue was dissolved in water and filtered, and any hydrogen fluoride still present was neutralized using aqueous potassium hydroxide solution. The potassium fluoride solution was concentrated. The chloride content of the potassium chloride was less than 10 ppm, organic compounds could not be detected, and the carbon content was less than 0.2% by weight.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for recovering alkali metal fluorides and/or difluorides from waste mixtures containing alkali metal chlorides and/or alkali metal fluorides and/or difluorides and, optionally, organic compounds, comprising (a) subjecting a waste mixture comprising one or more alkali metal chlorides and/or one or more alkali metal fluorides and/or difluorides and, optionally, one or more organic compounds, to a thermal/oxidative pre-treatment or a combination of a thermal/oxidative pre-treatment and an extractive pre-treatment, wherein the thermal/oxidative pre-treatment is carried out by heating the waste mixture in the presence of air or elemental oxygen at a temperature of from 400 to 1110° C. for from 10 sec. to 5 hours (b) bringing the pre-treated mixture into contact with hydrogen fluoride, and (c) recovering the resultant alkali metal fluorides and/or difluorides.

2. A process according to claim 1 wherein the waste mixture comprises 30 to 60% by weight of alkali metal chlorides, 10 to 50% by weight of alkali metal fluorides and/or difluorides, and from 0 to 20% by weight of organic compounds.

3. A process according to claim 1 wherein the waste mixture is subjected to extractive treatment in an extractor using a solvent in which the alkali metal chlorides, fluorides, and difluorides are insoluble or sparingly soluble.

4. A process according to claim 1 wherein the alkali metal is potassium.

5. A process according to claim 1 wherein the waste mixture, after the thermal/oxidative and/or extractive treatment has been carried out, has a carbon content of from 0.01 to 5%.

6. A process according to claim 1 wherein the pre-treated waste mixture is brought into contact with hydrogen fluoride at a temperature of from −10° C. to 500° C.

* * * * *